United States Patent [19]
Kobayashi et al.

[11] 4,349,265
[45] Sep. 14, 1982

[54] SUPPORT STRUCTURE FOR THE APERTURE SIGNAL TRANSMITTING MEANS IN A CAMERA LENS ASSEMBLY

[75] Inventors: Kazufumi Kobayashi, Tokyo; Shigeru Hashimoto, Yokohama, both of Japan

[73] Assignee: Canon Kabushiki Kaisha, Tokyo, Japan

[21] Appl. No.: 215,646

[22] Filed: Dec. 12, 1980

[30] Foreign Application Priority Data

Dec. 17, 1979 [JP] Japan .......................... 54-174487[U]
Dec. 17, 1979 [JP] Japan .......................... 54-174488[U]

[51] Int. Cl.³ .................. G03B 17/00; G03B 9/02; G02B 7/02
[52] U.S. Cl. .................................... 354/286; 350/255; 354/270
[58] Field of Search ..................... 350/252, 255, 257; 354/270, 14 274, 286

[56] References Cited

U.S. PATENT DOCUMENTS 2,362,603 11/1944 Wittel ................................. 350/255
3,090,282 5/1963 Angenieux ........................ 350/255
3,864,707 2/1975 Shirasaki ............................ 354/271

FOREIGN PATENT DOCUMENTS 1160298 12/1963 Fed. Rep. of Germany ...... 354/270
491879 3/1954 Italy ..................................... 350/252

Primary Examiner—Donald A. Griffin
Attorney, Agent, or Firm—Toren, McGeady and Stanger

[57] ABSTRACT

In an interchangeable lens assembly for a camera, the aperture signal transmitting means are formed to include an axially elongate portion for communication of exposure control signals between a diaphragm mechanism in the lens assembly and a control mechanism in the camera body, and an annular portion having grooves or recesses therein for engaging bearing balls. The support structure includes a barrel member which is part of the lens assembly and which also includes a groove or recess cooperative with the groove or recess in the signal transmitting member to support the balls with retainer means being provided for the bearing balls. The retainer means is arranged between the signal transmitting member and the barrel member and is configured with an annular shape with holes equally spaced thereabout in a circular pattern about the optical axis of the lens assembly to retain the balls rotatably within the holes.

11 Claims, 14 Drawing Figures

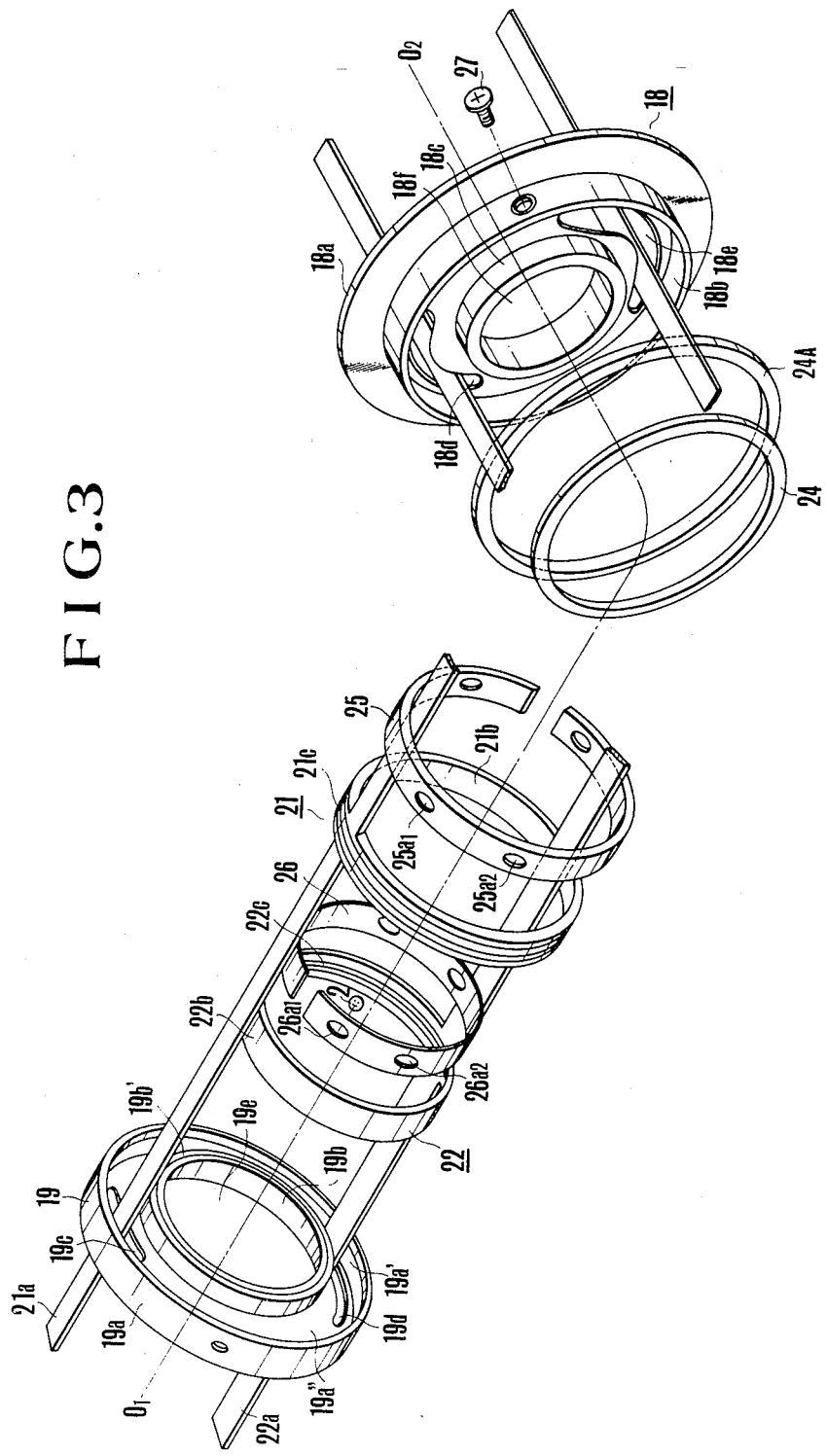

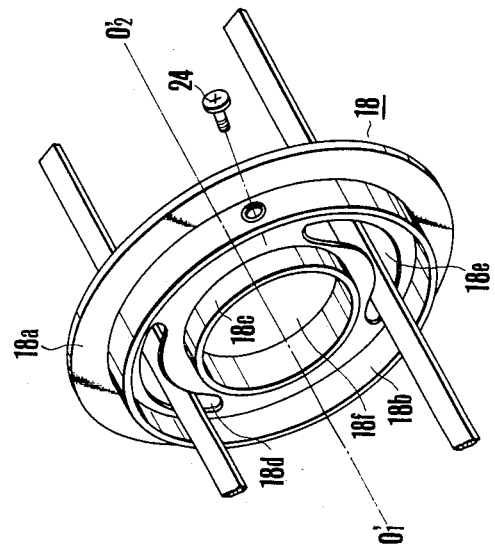
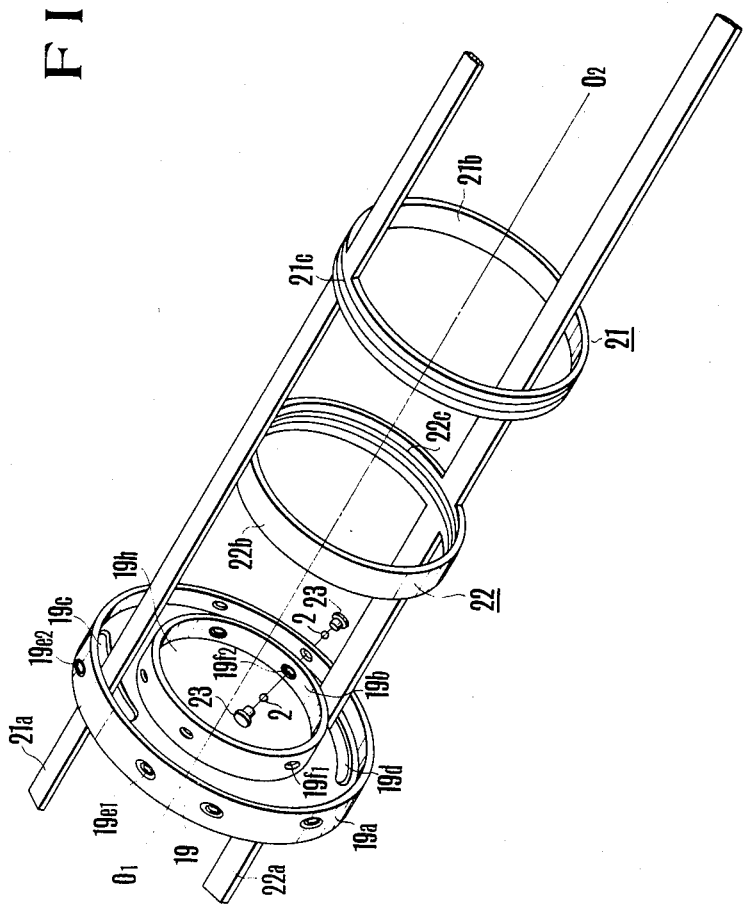
FIG.5

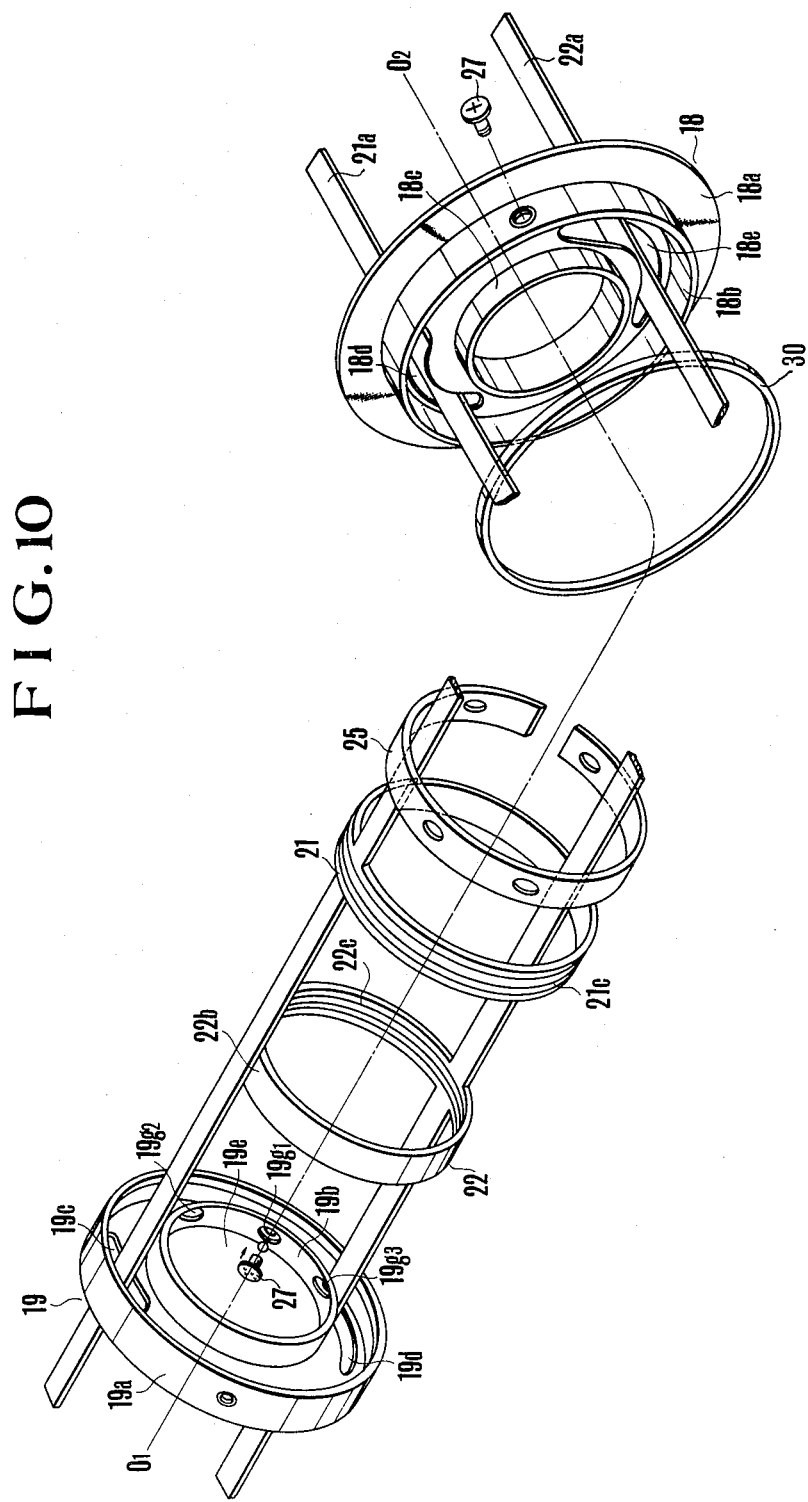

SUPPORT STRUCTURE FOR THE APERTURE SIGNAL TRANSMITTING MEANS IN A CAMERA LENS ASSEMBLY

The present invention relates generally to camera mechanisms and, more particularly, to an interchangeable lens assembly having a diaphragm mechanism and aperture signal transmitting means. The invention is more particularly directed to a support structure for the signal transmitting means. The signal transmitting means to which the present invention relates involves a signal transmitting portion which is rotatable about the optical axis of the lens assembly and which has an axially elongated construction in order to operatively interconnect the diaphragm mechanism in the lens assembly with the control mechanism in the camera body. Furthermore, the signal transmitting means include an annular portion adapted to engage bearing means for enabling the rotative movement of the signal transmitting device.

In the prior art, it is known to provide a support structure for the signal member of a lens assembly by utilization of an arrangement of bearing balls located around the entire periphery of an annular portion of the signal transmitting member. However, in an interchangeable lens assembly having this construction, problems arise in that noise is developed as a result of collision between the balls when the signal transmitting member is moved. Additionally, it has been found difficult to achieve cost reduction in the manufacture of such prior art devices.

It has also been known to provide a structure wherein the balls are not arranged in intimate contact with each other on the periphery of the annular portion of the signal transmitting member. However, in structures of this type, alternate problems arise in that there is provided no margin in the radial direction for the size of each member of the interchangeable lens assembly and, therefore, further improvements in optical performance and compactness of the lens assembly cannot be facilitated. Additional other structures are known where a minimum number of bearing balls are used as the bearing means for the signal transmitting member with the balls arranged at cardinal points around the circumference of the circle. However, here again, problems arise in that either the overall outer diameter of the lens assembly cannot be reduced or limitations are placed upon the largest light transmitting aperture that may be achieved by the lens assembly.

Accordingly, the present invention is directed toward a structure which will overcome many of the drawbacks of conventional prior art structures. The invention is directed toward a device wherein a faster interchangeable lens assembly may be provided even though the optical system of the lens assembly is itself of the same design as in conventional lens assemblies. This is achieved in the present invention by increasing the size of the opening through which light may pass in the lens assembly thereby affecting the relative aperture of the interchangeable lens assembly. In order to achieve a reduction in the cost of the assembly, the invention utilizes as a retainer means for the bearing balls of the signal transmitting member mounting mechanism a structure which enables the balls to be retained at predetermined points about the optical axis. Furthermore, the invention is intended to provide an interchangeable lens assembly which avoids utilization of bearing ball retainer devices such as those required in prior art structures and which facilitates reduction in the bulk and size of the lens assembly inasmuch as the effective aperture of the lens optical system may be increased and the outer diameter of the lens assembly can be decreased.

A further objective of the invention is to provide bearing ball retainer means which are capable of enabling a decrease in the number of balls necessary to provide the bearing function for supporting an annular portion of the signal transmitting member in rotatable relationship about the optical axis and which includes a support structure therefor.

The present invention is particularly suitable for providing a support mechanism in a lens assembly wherein a plurality of aperture signal transmitting members are utilized, for example, where the signal transmitting members are two in number. Since the support points of the signal transmitting members within the lens assembly are inherently limited depending upon the structure of the barrel, the barrel of the lens assembly tends to increase in diameter due to the annular portion of the support mechanism. Thus, a further objective of the invention is to provide a support structure which can avoid this point.

The invention is further directed toward provision of retainer means which make it possible for the bearing balls to be arranged on an annular portion of the signal transmitting member and to be held at arbitrary points which are constant in their position relative to the optical axis and in order to provide a support structure with such retainer means which enables a necessary number of bearing balls to be smoothly held at arbitrary points with the accuracy of signal transmission being improved.

SUMMARY OF THE INVENTION

Briefly, the present invention may be defined as a support structure for the signal transmitting means in a lens assembly which operate to transmit an exposure control signal between the lens assembly and a camera body and which comprise first and second signal transmitting members each including elongate portions for operative engagement between a diaphragm mechanism in the lens assembly and a control mechanism in the camera body and annular portions for supporting, respectively, within said lens assembly each of said first and second signal transmitting members, said annular portions each including groove means for engaging, respectively, first and second ball bearing means. The annular portions of the first and second signal transmitting members are positioned within an annular accommodating portion defined in the lens assembly and first and second retainer means are provided, respectively, on radially opposite sides of the annular portions of the first and second signal transmitting members. The first and second ball bearing means are in cooperative engagement between the groove means in the annular portions of each of the first and second signal transmitting members and the ball bearing means comprise a plurality of balls held in an equally spaced relationship about the optical axis of the lens assembly in a generally circular pattern defined by the first and second retainer means which are formed essentially as axial sleeves coaxial with the optical axis of the lens assembly.

The various features of novelty which characterize the invention are pointed out with particularity in the claims annexed to and forming a part of this disclosure. For a better understanding of the invention, its operat-

DESCRIPTION OF THE DRAWINGS

In the drawings:

FIG. 3 is an exploded perspective view depicting a first embodiment of the invention and shown with an optical axis $O_1$–$O_2$ bent in order to more clearly depict the structure of the parts shown;

FIG. 5 is an exploded perspective view of a support structure of the present invention shown in two parts in order to more clearly depict the structure thereof with the optical axes $O_1$–$O_2$ and $O_1'$–$O_2'$ although separately shown intended to depict a single axis;

FIG. 10 is an exploded perspective view showing the embodiment of the invention partially depicted in FIGS. 8 and 9 with the optical axis $O_1$–$O_2$ shown bent in order to clarify the construction of the elements shown.

DETAILED DESCRIPTION OF THE PREFERRED EMBODIMENT

Figure 1A:
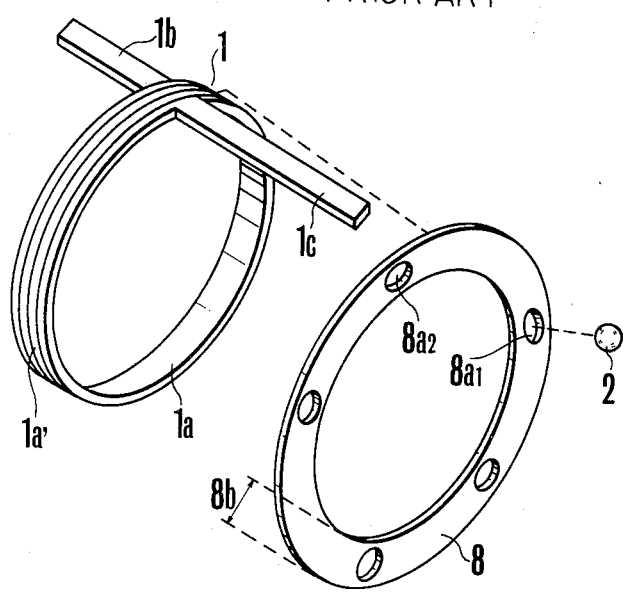
FIGS. 1(a) and 1(b) show the support structure of a signal transmitting member in accordance with conventional interchangeable lens mounting assemblies with FIG. 1(a) being an exploded perspective view of the parts thereof and with FIG. 1(b) being a sectional view of the main parts of the assembly.
Figure 1B:
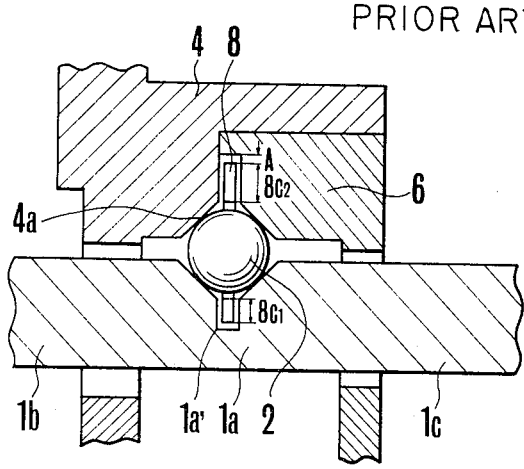

The present invention may be better understood by reference to FIG. 1(a) and FIG. 1(b) wherein there is depicted an arrangement of the type to which the present invention relates. The arrangement shown in FIGS. 1(a) and (b) includes the main parts of a support structure for a signal transmitting member which has been utilized in conventional lens assemblies. As shown in FIGS. 1(a) and (b), a signal transmitting member 1 is of the type which may be movably fitted on the inner diameter or on the outer diameter of the fixed lens barrel of a lens assembly. The signal member 1 includes an annular portion 1a and axially elongate portions 1b and 1c which extend axially forwardly and rearwardly from the annular portion 1a. One of the portions or arms 1b, 1c is adapted to cooperate with a diaphragm mechanism within a lens assembly and the other of the arms is adapted to project beyond the rear wall of the lens assembly into a camera housing in order to operatively engage with a corresponding control member in the camera housing.

On the outer peripheral surface of the annular portion 1a of the signal member 1 there is formed an integral groove 1a' having a V-shaped cross-sectional configuration. A number of bearing balls 2 are positioned in a space formed between a tapered surface 4a of a fixed barrel member 4 and the groove 1a' of the annular portion 1a. A holding member 6 is provided which forms a tapered surface on the same side of the ball 2 as the tapered surface 4a.

The assembly includes a retainer 8 having a generally circular annular shape which operates as a ball bearing retainer member. The retainer 8 is formed as a radial plate having holes $8a_1$, $8a_2$, etc. in which the balls 2 are fitted in almost equally spaced relationship relative to each other at arbitrary locations.

In the bearing having the construction described herein, the retainer 8 is formed with a width 8b which extends in the radial direction relative to the optical axis. Because of this, the configuration of the retainer 8 necessitates certain limitations in the dimensions of the inner and outer diameters of the device. That is, the retainer 8 must be made radially wider than the diameter of the hole $8a_1$ by an amount equivalent to the lengths $8c_1$ and $8c_2$ shown in FIG. 1(b). Therefore, the effective diameter of the lens optical system is caused to diminish by a length $8c_1$ and the outer diameter of the lens barrel must be increased by the length $8c_2$. Additionally, another problem arises in that, as the balls which are fitted in the holes $8a_1$, $8a_2$, etc. rotate in point contact with the tapered surface 4a, the inclined side walls of the groove 1a' and the tapered surface of the ball holder 6, the retainer 8 is itself allowed to rotate about the optical axis due to the provision of a gap between the inner circumferential edge of the retainer 8 and bottom surface of the groove 1a' as well as because of a void between the outer circumferential edge of the retainer 8 and the side wall of the recessed portion of the ball holder 6.

As a result, the effective aperture diameter of the lens optical system is further decreased. If the effective aperture diameter is taken at a desired value, the outer diameter of the lens barrel must be correspondingly increased. A further disadvantage arising from the use of expensive metals, such as phosphor bronze or brass in forming the retainer 8 is that it becomes difficult to achieve a desired decrease in costs. A further disadvantage is that the bearing of the construction illustrated in FIGS. 1(a) and (b) is not suitable for automatic assembly of the lens mounting unit. Considered in more detail, the automatic assembly process comprises the steps of seating the annular portion of the signal member 1 in the interior of the tubular body 4, inserting the retainer 8 into the space defined by the groove 1a' and the tapered surface 4a, bringing the balls 2 into fitted engagement in the respective holes $8a_1$, $8a_2$, etc. and finally putting the ball holder 6 in place. In this process, the steps of inserting the retainer 8 followed by positioning of the balls in the individual holes $8a_1$, $8a_2$, etc. have been difficult to perform by automatic machinery.

Furthermore, the use of a bearing constructing with a retainer 8 shaped in a donut-like manner extending in a direction perpendicularly to the optical axis is, due to the necessity of the aforementioned surplus dimensions $8c_1$ and $8c_2$, and because of the gap A, likely to lead to difficulty in providing for the interchangeable lens assembly increases in the size of the diaphragm aperture, thus resulting in a barrier to provision of faster interchangeable lenses.

Figure 2:
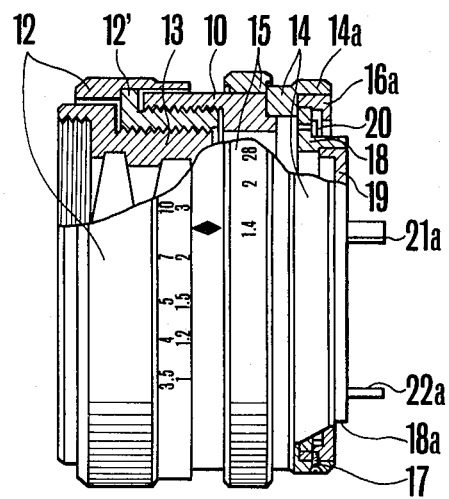
FIG. 2 is a side view broken away and partially in section showing an interchangeable lens assembly suitable for application therein of the present invention.

The present invention is aimed toward overcoming these disadvantages and in FIG. 2 there is shown an embodiment of a mounting mechanism for an interchangeable lens assembly wherein an improved support structure in accordance with the present invention may be utilized. In the assembly shown in FIG. 2, there is provided a tubular body 10 having a threaded surface for distance adjustment or focusing formed in a front inner portion thereof. A distance adjusting or focusing ring 12 is provided in cooperative engagement with an intermediate helicoid sleeve 12' which meshes with the threaded surface on the tubular body 10. A moldable inner sleeve 13 containing an optical member is formed with a helicoid surface formed in the outer periphery thereof which meshes with the inner helicoid of the helicoid sleeve 12'. A bayonet holder ring 14 is fixedly mounted at the rear end of the tubular body 10 and includes on the outer periphery thereof a reference mark 14a which identifies an attachment reference position relative to the camera for the lens assembly.

A diaphragm preset ring 15 is rotatably fitted in a recessed portion formed between the tubular body 10 and the holder ring 14. A bayonet member 16 is fitted in a counterbored portion at the rear end of the holder ring 14 and functions to effect engagement with bayonet means on the camera housing in order to attach the lens assembly to the camera housing. The bayonet member 16 is fixedly secured to the holder ring 14 by a fastener screw 17.

The lens assembly includes an adapter member 18 which is rotatably fitted in a recessed portion between the holder ring 14 and the bayonet member 16 and which includes a reference fitting diameter portion 18a formed to a tubular shape at the rear end thereof. A back cover member 19 having an axial aperture is affixed to the adapter member 18 by fastening screws (not shown).

When the lens assembly is mounted upon a camera, the adapter member 18 is held stationary relative to the camera and the other elements of the lens assembly, including the bayonet member 16, may be rotated relative to the camera in order to affix the lens assembly on the camera. A position determining pin 20 which defines a reference position of the adapter member 18 relative to the camera is mounted upon a reference position surface of the adapter member 18 and is arranged to engage a slit or recess (not shown) formed in the camera body in order to hold the adapter member 18 rotatably fixed relative to the camera body so that rotation thereof will be restrained while the other elements of the lens assembly, including the bayonet member 16, may be rotated for engagement and disengagement of the lens assembly with the camera body.

The aperture signal transmitting means of the lens assembly of the invention include a preset aperture signal transmitting control member 21a which is formed together with a ring 21, best seen in FIG. 3, rotatably arranged relative to the adapter member 18 in order to transmit an aperture signal between the camera and the lens assembly, particularly the diaphragm mechanism thereof.

The aperture signal transmitting means of the invention will operate either with the camera and the lens assembly set in the automatic diaphragm adjustment exposure mode or when set in the manual diaphragm adjustment exposure mode. An automatic diaphragm drive lever 22a projects outwardly beyond an arcuate cutout provided in the back cover 19 with the member or lever 22a being formed together with an automatic diaphragm ring 22 (best seen in FIG. 3) rotatably arranged in the tubular body 10. Since the mount mechanism and cooperating mechanism with the diaphragm device in the interchangeable lens assembly shown in FIG. 2 are described in Japanese Patent Application Sho 52-44247 filed Apr. 18, 1977, a more detailed explanation thereof is not set forth herein.

It thus should be noted that the embodiment of the present invention is described as applied to a type of interchangeable lens mounting mechanism which, when the interchangeable lens assembly is being attached to a camera body, allows the operator to rotate any part of the lens assembly in order to effect engagement of the bayonet means while the adapter member remains stationary. When attachment of the lens assembly to the camera body is being performed, the operator inserts the position determining pin 20 into a slit (not shown) in the camera body and rotates the coupling members or bayonet rings of the lens assembly and the camera body relative to each other. This then rotates the lens relative to the camera body and this may be accomplished by grasping either the distance adjusting or focusing ring, the tubular body 10, or the diaphragm ring 15 whereby the coupling mechanism may be tightened while the adapter member and the back cover member are maintained stationary. During adjusting of the position of the position determining pin 20 relative to the slit in the camera, the lens-side automatic diaphragm lever 22 is brought into operative connection with a control member on the camera side. This connection is maintained during the tightening operation since the automatic diaphragm lever 22 remains stationary.

The main parts of a support structure in accordance with the present invention are depicted in FIGS. 3 and 4. As shown therein, the adapter member 18 is provided with a circular plate member 18a, a first cylindrical projected portion 18b on the outer diameter of the circular member 18a extending axially therefrom, and a second cylindrical projected portion 18c on the inner diameter side thereof, each of the projected portions 18b and 18c being formed to extend toward the camera body. Formed between the first and the second projected portions 18b and 18c are arcuate cutout portions 18d and 18e arranged in coaxial relationship with the optical axis $O_1$–$O_2$, with the respective signal members 21a and 22a extending through the cutout portions. A light transmitting aperture portion 18f is also provided.

The back cover member 19 is arranged to be inserted into a circumferential recess formed between the first and second projected portions 18b and 18c of the adapter member 18, with the member 19 having an outer first cylindrical portion 19a and an inner second cylindrical portion 19b with a planar member 19a'' extending therebetween in which there are formed arcuate cutout portions 19c and 19d arranged in coaxial relationship with the optical axis $O_1$–$O_2$ through which the respective signal members 21a and 22a extend. A light transmitting aperture 19e is also provided.

The first and second cylindrical portions 19a and 19b are provided with corner portions 19a' and 19b' which have tapered surfaces adapted to receive bearing balls. Grooves or recesses 21c and 22c are formed in the outer and inner peripheral surfaces of the annular portions 21b and 22b of the signal transmitting members respectively, with the grooves having tapered surfaces formed with a V-shaped configuration for permitting the bearing balls to rotate while at the same time retaining the balls therein.

Figure 4A:
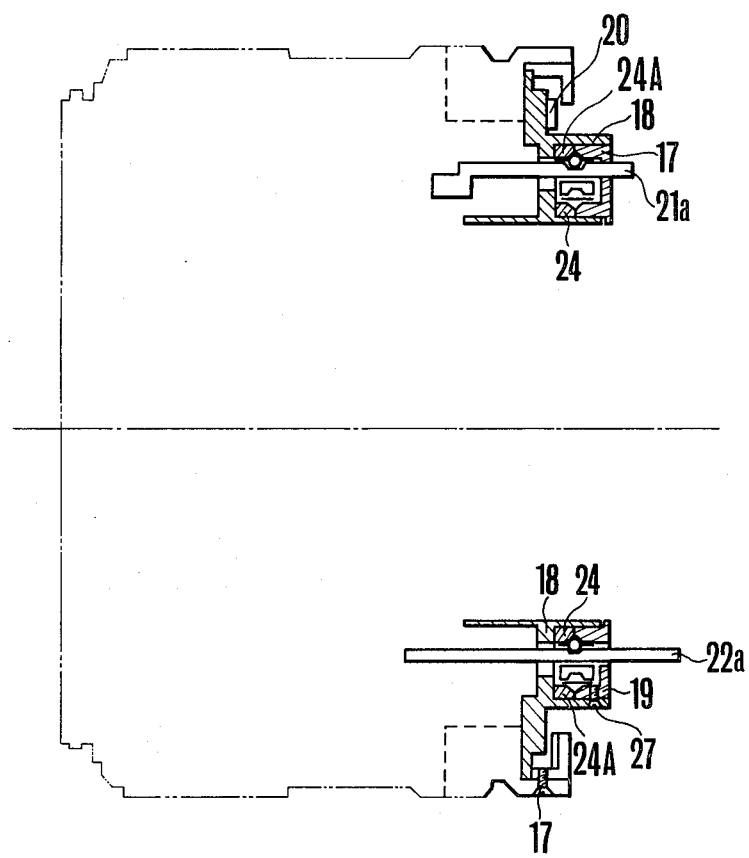
FIG. 4(a) is a sectional view of the main parts of the bearing means in the first embodiment of the invention.
Figure 4B:
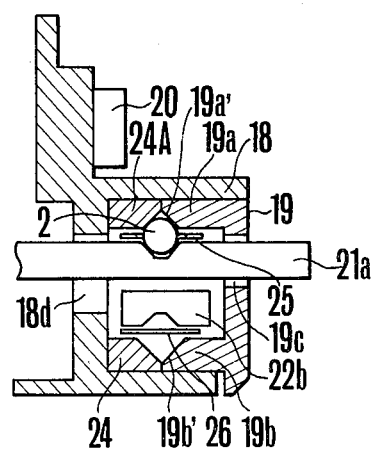
FIG. 4(b) is a partial sectional view showing in greater detail parts of the first embodiment of the invention.

The support mechanism of the invention includes annular members 24A and 24 which, as shown in FIGS. 4(a) and 4(b) are positioned with the larger diameter annular member 24A in the corner of the inner diameter portion of the first projected portion 18b of the adapter member 18. A portion of the annular member 24A is formed with a tapered surface upon which the bearing balls 2 engage.

The annular member 24 is formed with a smaller diameter than that of the member 24A and is fitted on the outer side of the second projected portion 18c of the adapter member 18. The annular member or ring 24 is provided with a tapered surface upon which the balls 2 engage. It should be noted that the ring members 24A and 24 may be manufactured either separately from the adapter member 18 as shown in FIGS. 3 and 4(a)-(b) or, when the adapter member 18 is made of synthetic resin, they may be manufactured unitarily with the adapter member 18. Retainer members 25 and 26 are provided for retaining the bearing balls 2 in position and, as shown in FIG. 3, the retainer members 25 and 26 are formed as discontinuous thin circular belts having formed therein holes $25a_1$ $25a_2$, etc. in the member 25 and holes $26a_1$, $26a_2$ in the member 26 with the holes being arranged almost equally spaced to accommodate the balls 2. The retainer member 25 is arranged on the outer diameter of the ring portion 21b and the retainer member 26 is arranged on the inner diameter of the ring portion 22b, as best seen in FIGS. 4(a) and 4(b).

In the process of assembling a support structure in accordance with the present invention with the elements previously described herein, the ring 23 is inserted into the inner diameter of the first projected portion 18b and the ring 24 is arranged to overlap on the outer diameter of the second projected portion 18c. Thereafter, the ring portions 21b and 22b of the transmission member 21 and of the automatic diaphragm member 22 are inserted into a space between the first and the second projected portions 18b and 18c of the adapter member 18. The ball retainer members 25 and 26 are then inserted into the spaces formed by the tapered surfaces of the rings 24A and 24 and the grooves 21c and 22c of the annular portions 21b and 22b. The bearing balls are then fitted into holes $25a_1$, $25a_2$, etc. and into holes $26a_1$, $26a_2$, etc. The back cover member 19 is then put into place and the adapter member 18 and the back cover 19 are fixed with each other by screw fasteners 27.

Thus, as shown in FIGS. 4(a) and 4(b), each of the transmission member 21 and the automatic diaphragm member 22 is rotatably held in the space defined by the tapered surfaces 19a', 19b' and the tapered surfaces of the rings 23, 24 through the balls 2. Also, the balls 2 will be arranged at constant equally spaced positions in a circle about the optical axis of the lens assembly by the retainer members 25, 26. Thus, when the signal member rotates about the optical axis, the balls will rotate about their own axes within the respective holes $25a_1$, $25a_2$, etc. and $26a_1$, $26a_2$, etc. and they will revolve around the optical axis.

As a result of the construction of the present invention, it will be possible to increase the effective aperture diameter of the optical system and also to decrease the outer diameter of the lens barrel or of the overall lens assembly.

Furthermore, the ball retainer members 25 and 26 may be made thinner by use of a plastic material such as nylon, thereby contributing to a reduction in cost.

Figure 6:
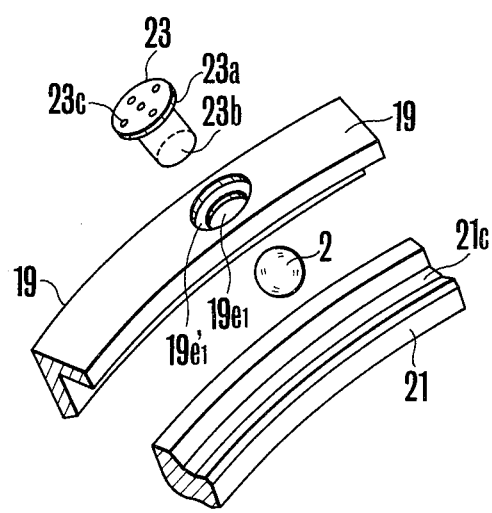
FIG. 6 is a fragmentary exploded perspective view showing in greater detail parts of the apparatus depicted in FIG. 5.
Figure 7:
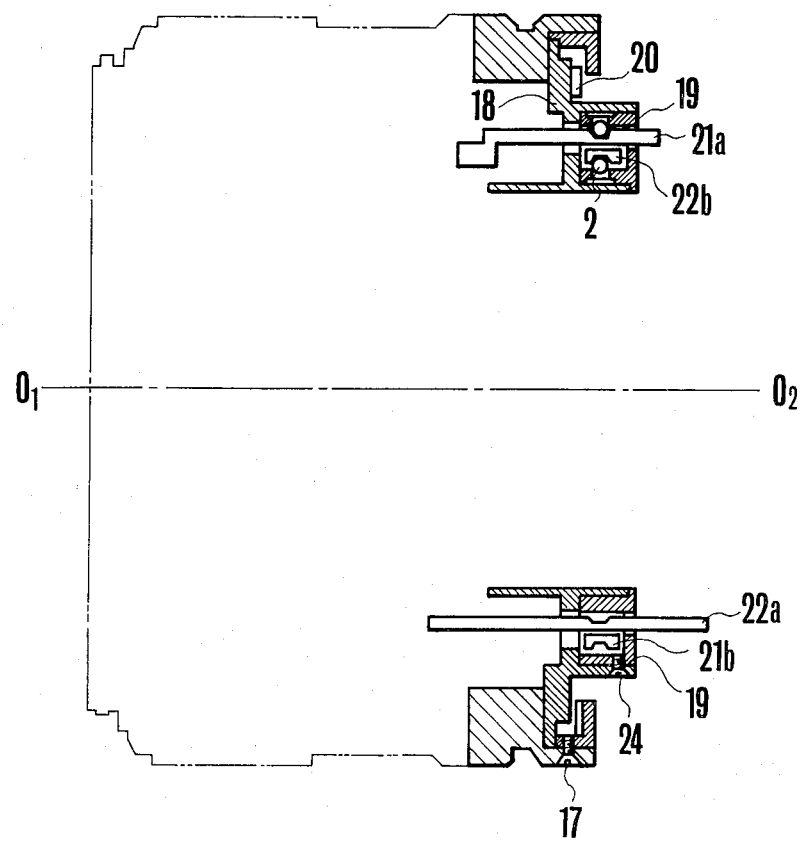
FIG. 7 is a sectional view of the main parts of the bearing portion of the invention in accordance with the embodiment shown in FIG. 5.

The main parts of a second embodiment of a support structure for the ring 21 and the automatic diaphragm member 22 are shown in FIGS. 5-7. As indicated therein, the adapter member 18 is provided with a first projected portion 18b and in the inward direction therefrom with a second projected portion 18c. A circular plate portion 18a located between the first and second projected portions is provided with arcuate cutouts 18d and 18e formed therein and a light transmitting aperture 18f is also provided.

The back cover member 19 is formed with an outer cylindrical portion 19a and with an inner cylindrical portion 19b which define therebetween a generally U-shaped cross-sectional space which may be inserted between the first projected portion 18b and the second projected portion 18c of the adapter member 18 and there is further provided arcuate cutouts 19c and 19d through which the transmission member 21a and the lever 22a may extend.

The annular portion of the transmission member is provided with a groove or recess formed on the outer periphery thereof having a V-shaped or semicircular cross-sectional configuration. An annular portion of the automatic diaphragm lever is provided with a similar groove or recess formed on the inner periphery thereof.

It is noted that the embodiment of the invention is described as applied to a new type of interchangeable lens mounting system shown in FIG. 2.

The outer cylindrical portion 19a and the inner cylindrical portion 19b of the member 19 are, as shown in an enlarged scale in FIG. 6, provided with holes $19e_1$, $19e_2$, etc. extending radially in almost equally spaced relationship with, for example, five position points being provided, the holes $19e_1$, $19e_2$, etc. having stepped portions $19e'_1$, $19e'_2$, etc. The inner cylindrical portion 19b is similarly provided with holes $19f_1$, $19f_2$, etc. having stepped portions $19f'_1$, $19f'_2$, etc. (not shown). Ball holder members identified by reference numeral 23 are inserted into the respective holes $19e_1$, $19e_2$, etc. and $19f_1$, $19f_2$, etc. in order to hold the respective balls. The ball holder or retainer members 23 each have a flanged portion 23a which operate to determine the position of the retainer members in the radial direction of the optical axis of the lens assembly. Also provided are semi-spherical recesses 23b for holding a ball 2 at the front end of the retainer member 23. The flanged portions 23a of the retainer members are provided with a plurality of projected portions $23c_1$, $23c_2$, etc. on the surface thereof, as best seen in FIG. 6. The signal transmission members 21 and 22 are arranged with their armed portions extending through the respective cutouts 18d, 18e, 19c, 19d and arranged in overlapped relationship in a space defined by the outer and the inner cylindrical portions 19a and 19b of the back cover member 19. The bearing balls 2 are placed, respectively, between the grooves in the annular portions of the respective signal members and the cylindrical portions 19a and 19b of the back cover member 19. When a ball retainer member 23 is inserted in a hole $19e_1$, $19e_2$, etc. or $19f_1$, $19f_2$, etc., the balls are held in the front end recesses 23b. With this arrangement, the annular members 21b and 22b will be rotatably supported on the back cover member 19 by the rotatable balls.

When the ball retainer members 23 are inserted into the holes 19$e_1$, 19$e_2$, etc., the projected portions 23c of the ball holder members 23 will be slightly exposed outwardly of the outer periphery of the cylindrical portion 19a. Similarly, the ball retainer members 23 which are placed in the respective holes 19$f_1$, 19$f_2$, etc. will also have their projected portions 23c slightly exposed inwardly beyond the inner periphery of the inner cylindrical portion 19b. Thus, when the outer and inner cylindrical portions 19a and 19b of the back cover member 19 are fitted into the space between the first and second projected portions 18b and 18c of the adapter member 18, the projected portions 23c of the retainer members 23 will abut against the sides of the projected portions 18b and 18c and thereby the retainer members 23 will be fixedly secured in place within the apertures in the back cover member 19 and the back cover member 19 and the adapter member 18 will be maintained in close contact with each other in the assembly.

In addition, the adapter member 18 and the back cover member 19 are affixed together by screw fasteners 24.

It will of course be noted and understood that the retainer members 23 which operate to retain the balls for the ring 21b of the transmission member 21a are inserted from the outside of the outer cylindrical portion 19a and that the other retainer members 23 which hold the balls for the ring 22b of the automatic diaphragm lever 22a are inserted from the inside of the inner cylindrical portion 19b of the back cover member 19.

As indicated in the foregoing, the support structure for the signal members 21a and 22a of the present invention is such that, as shown in FIG. 7, the annular portions 21b and 22b of the signal members 21a and 22a are superimposed in a multilayered fashion in the inside of the back cover member 19 within the U-shaped annular recess formed therein. The bearing balls are placed in the grooves 21c and 22c of the annular portion and they are rotatably held between the front end recesses 23b of the retainer members 23 and the grooves 21c and 22c. As a result, the signal transmitting members 21a and 22a, while projecting outwardly through the arcuate cutouts 19c and 19d, are supported in a rotatable manner within a predetermined angular range. Furthermore, by inserting the back cover member 19 into the space between the first projected portion 18b and the second projected portion 18c of the adapter member 18 and by effecting a screw-fastening connection, each signal member 21a, 22a is made rotatable over a predetermined range of rotation while passing through and projecting from the arcuate cutouts 19c and 19d of the back cover member toward the camera body.

As indicated above, the embodiment of the invention described is arranged with a groove 21c, 22c formed in the outer circumferential surface or in the inner circumferential surface of the annular portions of the preset diaphragm aperture signal transmitting control member 21 or the automatic diaphragm lever 22. Additionally, in accordance with the invention, the back cover member 19 which constitutes part of the interchangeable lens assembly mounting is provided with a portion 19a or 19b overlapping in part with the annular portion 21b, 22b taken in the axial direction and the invention also provides for the overlapped portion 19a, 19b of the member 19 to be formed with holes 19$e_1$, 19$e_2$, and 19$f_1$, 19$f_2$ at almost equally spaced points around the periphery of the assembly so that the ball retainers 23 may be mounted in position for rotatably holding the bearing balls 2. Thus, in accordance with the invention, the balls will be held at constant positions around the optical axis and each signal member 21, 22 will be supported to be rotatable about the optical axis by the balls 2 at the indicated overlapped portion of the back cover member 19. The front ends 21a and 22a of the signal members 21 and 22 are arranged after having passed through the cutouts 18d and 18e to cooperate with a diaphragm device or with a preset mechanism (not shown) and to be rotatable in correspondence with the set aperture value of the diaphragm preset ring of the lens assembly.

In explaining the embodiment of FIGS. 5-7, there has been used, as an example of the type of interchangeable lens assembly mounting mechanism involved, a mechanism such as that disclosed in the previously cited Japanese Patent Application Sho 52-44247. However, it should be understood that the present invention is not confined to the selection of the form of the mounting mechanism of the interchangeable lens assembly nor to the diaphragm control mechanism, but is instead applicable as a support structure for the signal members of other types of interchangeable lens assemblies in order that the signal members may be mounted for rotation about the optical axis to enable communication of appropriate aperture signal between the camera body and the interchangeable lens assembly. This constitutes a significant advantage of the invention.

Furthermore, in 35 mm single lens reflex cameras, there is normally provided an interchangeable lens utilizing bearing balls whose diameter is taken at an appropriate value of about 1 mm in accordance with the prior art by taking into account the outer diameter of the lens barrel and the effective aperture ratio of the lens optical system. In this connection, it should be noted that the sizes and shapes of the various portions of the retainer members 23 are determined by the size of the recess 23b; that is, the diameter of the ball. Furthermore, the sizes of the various portions of the ball retainer members are determined in a unit of several millimeters with the diameter of the ball as the standard and the cost of materials is capable of being largely reduced by forming the retainer members 23 of a plastic material, thermoplastic resin being particularly preferred.

It is noted that, in the present invention, although it would be assumed that the material of the bearing balls 2 would be steel, since steel balls are generally used in the art of bearings, balls of hard plastic material have been found to be capable of enduring long usage.

It is also noted that in the present invention, although the interchangeable lens illustrated is of the type having the signal transmitting member 21 and the automatic diaphragm member 22 as the signal members, it is of course possible that the principle of the invention may be applied to other types of interchangeable lens mountings wherein the controls for signal communication involve only one signal member.

As in the foregoing, the support structure of the present invention involves an effective aperture diameter 19h of the lens which may be made larger than that of conventional retainer type structures by several millimeters, in this instance 2.6 mm or more, and thereby the interchangeable lens may be made faster by one step.

That is, in the embodiment of FIGS. 5-7, the thicknesses of the first and second projected portions 19a and 19b of the back cover member 19 may be reduced by 2.6 mm or more in this embodiment and thereby the inner diameter of the light transmitting opening of the back cover member 19 may be increased. Since more light may be transmitted at the highest aperture value, a faster shutter speed may be provided at this aperture value and, thus, a faster lens assembly may be enabled.

A further embodiment of the invention is depicted in FIGS. 8-11 wherein the signal transmission member 21 is supported by the method described in connection with the embodiment of FIGS. 2-4 while the automatic diaphragm member 22 is supported by the structure of the second embodiment described above in connection with FIGS. 5-7. In FIGS. 8-11, the same reference characters have been employed to denote parts similar to those shown in FIGS. 2-7.

Figure 8:
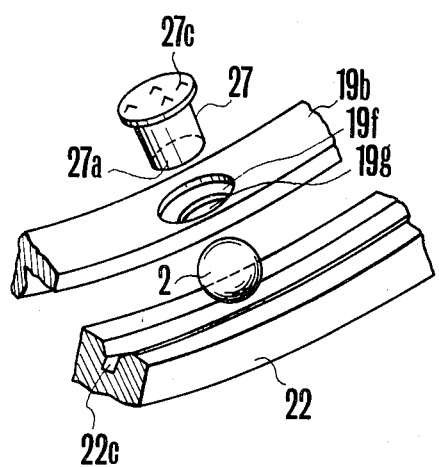
FIG. 8 is a fragmentary exploded view perspective view showing on an enlarged scale a further embodiment of the invention.

As shown in FIG. 8, the back cover member 19 is formed with holes 19g having steps 19f, similar to those shown in connection with the embodiment of FIG. 5, at a plurality of points equally spaced about the optical axis formed on the inner cylindrical portion of the member 19. Inserted into the holes 19g are ball retainer members 27 having recesses 27a of a size almost equal to the radius of a bearing ball. The recesses are formed on the front surfaces of the retainers 27 and the balls are fitted in the recesses 27a and they are held in a space defined by the tapered surfaces of the groove 22c in the inner circumferential surface of the annular portion of the automatic diaphragm member and the front end recess 27a of the retainer member 27, as shown in FIG. 6.

With regard to the assembly process of the present embodiment, the ring portion 22b of the automatic diaphragm member is first brought into fitted engagement on the outer diameter of the inner cylindrical portion 19b of the back cover member 19 while the groove 22c of the annular portion 22 is aligned with the holes 19$g_1$, 19$g_2$, of the cylindrical portion.

A bearing ball is next inserted from the holes 19$g_1$ of the cylindrical portion 19b into the grooves 22c of the ring portion 22b and a ball retainer member 27 is then placed from the side of the light transmitting opening portion 19e. Thus, the automatic diaphragm member 22b is rotatably held in the back cover member 19.

Figure 9:
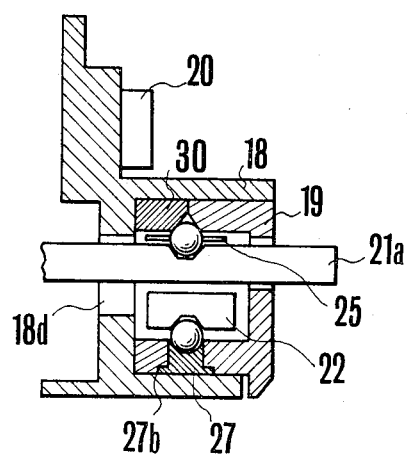
FIG. 9 is a sectional view showing on an enlarged scale the main parts of the support structure in accordance with the embodiment of FIG. 8.

Subsequently, the transmission member 21 is assembled by the structure and method shown in FIGS. 5-7 so that the transmission member 21 and the automatic diaphragm member 22 are supported to be rotatable about the optical axis in the adapter member 18, as shown in FIG. 9. The ball retainer members 27 are provided with flanged portions 27b so as to be capable of being dropped into the stepped portions 19f of the holes 19g of the cylindrical portion 19b. Formed on the light transmitting aperture side surface of the flanged portion are a plurality of projected portions 27c, although one such projected portion would be sufficient. The size of the projected portions 27c is determined to be such that it will be somewhat exposed to the light passage aperture side so that when the back cover member 19 is brought into fitting engagement between the first and second flanged portions 18b and 18c of the adapter member 18, the projected portions 27c will abut against the outer periphery of the second flanged portion 18c of the adapter member 18 whereby the ball retainer member 27 will be fixedly secured in place.

Figure 11A:
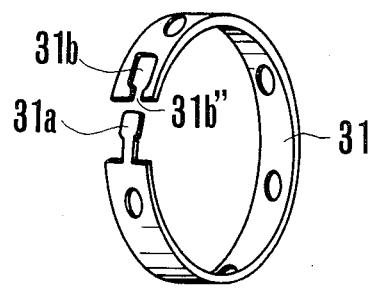
FIGS. 11(a) and 11(b) show another example of ball bearing retainer means in accordance with the invention, with FIG. 11(a) being a perspective view and with FIG. 11(b) being a fragmentary view showing the parts on an enlarged scale.
Figure 11B:
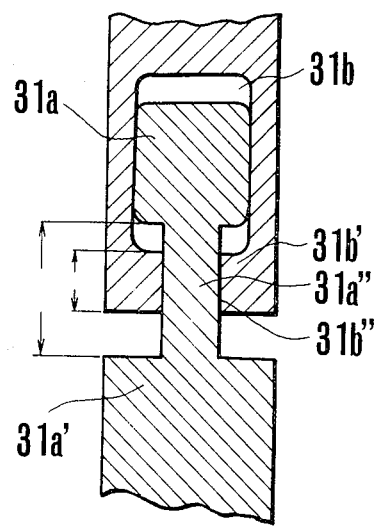

Another example of a ball retainer device is shown in FIGS. 11(a) and 11(b) wherein a belt 31 of the type similar to the belts 25, 26 is utilized. The belt 31 has formed at its ends 31a and 31b connecting portions for coupling with each other, with one end being configured as a male projection 31a and the other end as a female cutout 31b. The belt 31 can be manufactured of a thin metallic material or from synthetic resin material by pressing, punching, or the like. The connecting portions 31a and 31b of the belt 31, when assembled with each other as shown in FIG. 11(b), are provided with some play so that the diameter of the belt can be lengthened or shortened.

That is, between one end portion 31a' and the projected portion 31a' there is provided a neck 31a'' and a constricted portion 31b', of the belt of the cutout portion of the other end is formed with an opening portion 31b'' through which the neck 32a'' passes. Thus, when the endless belt 31 is used in place of the previously described 25, 26, ambient temperature changes will not cause displacement of the belt since the belt will be capable of expansion and contraction.

Thus, from the foregoing it will be seen that the support structure of the present invention is directed toward retainer means for holding the bearing balls which comprise a discontinuous thin belt-like ball holder member.

In accordance with the invention, even when the belt is elongated as ambient temperature changes occur, the elongation will be absorbed by portions of the belt so that the retainer member 25, 26, 27 will not interfere with the signal members or support members. Accordingly, it will be seen that the present invention provides an excellent approach toward preventing loss of rotative performance of the signal members.

While specific embodiments of the invention have been shown and described in detail to illustrate the application of the inventive principles, it will be understood that the invention may be embodied otherwise without departing from such principles.

What is claimed is:

1. A support structure for signal transmitting means in a lens assembly for transmitting an exposure control signal between said lens assembly and a camera body comprising:
  a first signal transmitting member including elongate portions for operative engagement between a mechanism in said lens assembly and a control mechanism in said camera body, and an annular portion for support in said lens assembly, said annular portion including groove means for engaging first ball bearing means;
  a second signal transmitting member including elongate portions and an annular portion, said annular portion being arranged in coaxial relationship with said annular portion of said first signal transmitting member about the optical axis of said lens assembly and having groove means for engaging second ball bearing means;
  a barrel member constituting part of said lens assembly, said barrel member defining an annular accommodating portion for containing said annular portions of said first and second signal transmitting members;
  cover means of said lens assembly, said cover means being formed to include a portion for covering said accommodating portion of said barrel member and a portion cooperative with said groove means of one of said first and second signal transmitting members to form a space for accommodating said first and second ball bearing means;

first retainer means for said first ball bearing means arranged between said groove means of said first signal transmitting member and said cover means and having a generally circular configuration centered at the optical axis of said lens assembly, said first retainer means being formed as a thin axial sleeve including holes for retaining therein said first ball bearing means in generally equally spaced relationship in said circular configuration about said optical axis; and second retainer means for said second ball bearing means arranged between said groove means of said signal transmitting member and said cover means and having a generally circular configuration centered at said optical axis, said second retainer means being formed as a thin axial sleeve including holes for retaining therein said second ball bearing means in generally equally spaced relationship about said optical axis; at least one of said first and said second retainer means being formed as a discontinuous sleeve having end portions which are connectable together to be movable relative to each other in order to enable adjustment of the diameter of said sleeve about the optical axis of said lens assembly.

2. A support structure according to claim 1 wherein said ends of said discontinuous sleeve have engagement portions with the engagement portion of one end engaging in an opened portion provided in the other end.

3. A support structure for the signal transmitting means in a camera lens assembly comprising:

signal transmitting means having a signal transmitting portion for communicating an exposure signal between a mechanism in said lens assembly and a mechanism in a camera body to which said lens assembly is attached and an annular portion for enabling said signal transmitting means to be rotatably mounted about the optical axis of said lens assembly by bearing balls within said lens assembly, said annular portion of said signal transmitting means having groove means for engagement with said bearing balls;

a barrel member constituting part of said lens assembly, said barrel member having a circumferential groove comprised of first and second cylindrical portions located radially outwardly of a light transmitting opening defined through said barrel member in order to accommodate said annular portion of said signal transmitting means;

cover means covering a portion of said circumferential groove of said barrel member; and means for retaining said bearing balls at predetermined positions within said groove of said barrel member, said retaining means holding said balls individually separately by said cover means at positions lying in a circle coaxial with the optical axis of said lens assembly; said retaining means being inserted into support apertures provided in said cover means, said retaining means being formed with a cavity of almost semispherical form at an end thereof to hold said bearing balls.

4. A support structure for the signal transmitting members of a camera lens assembly comprising:

first and second signal transmitting means having signal transmitting portions for exposure control signal communication between a mechanism in said lens assembly and a mechanism in a camera to which said lens assembly is attached, said first and second signal transmitting means including annular portions for rotatably supporting said signal transmitting means about the optical axis of said lens assembly with a plurality of bearing balls located in almost equally spaced relationship in a circular pattern about the optical axis of said lens assembly, said annular portion of said signal transmitting means including groove means for holding said bearing balls;

a barrel member constituting part of said lens assembly, said barrel member having a circumferential groove comprised of first and second cylindrical portions located radially outwardly of a light transmitting aperture in said barrel member for rotatably holding said first and second signal transmitting members about said optical axis;

cover means covering a part of said groove of said barrel member; and means for retaining said bearing balls in predetermined positions within said groove of said barrel member, said retaining means defining together with said groove means in said first and second signal transmitting means a space within which each of said retaining balls is held for rotatably supporting said annular portions of said first and said second signal transmitting means; said retaining means being inserted into support apertures provided in said cover means, said retaining means being formed with a cavity of almost semispherical form at an end thereof to hold said bearing balls.

5. A support structure for signal transmitting means in a lens assembly comprising:

a signal transmitting member having an auxiliary elongate portion and an annular portion, with groove means being provided on said annular portion for holding balls;

barrel means constituting a part of said lens assembly, said barrel means having formed therein groove means cooperating with said groove means in said signal transmitting member to hold said balls; and circular belt members which are placed within a space formed by said groove means of the signal transmitting member and said barrel means, said circular belt members having holes provided therein for retaining said balls at a predetermined positions around the optical axis of said lens assembly within said space, wherein said signal transmitting member is retained in a rotatable manner about the optical axis at a fixed position of said barrel member by an engagement of said balls with said groove means of the annular portion.

6. A support structure for signal transmitting means in a lens assembly comprising:

a signal transmitting member having an axially elongate portion and an annular portion, said annular portion forming a groove for holding bearing balls;

barrel means constituting a part of said lens assembly, said barrel means having holes formed therein in a circular pattern about the optical axis of said lens assembly; and retainer members which are inserted in said holes of the barrel means for retaining said bearing balls at a predetermined positions about the optical axix, said retainer members being fixed at said barrel means by being inserted into said holes, with contact portions of said retainer members contacting said bearing balls being so made as to cooperate with said groove portion of the signal transmitting member to retain said bearing balls in a rotatable manner at a predetermined position of the barrel means, thereby retaining said signal transmitting member by the bearing balls in a rotatable manner about the optical axis and at a predetermined position in the optical axis direction at the barrel means.

7. A support structure for signal transmitting means in a lens assembly comprising.

first and second signal transmitting members having signal transmitting portions for exposure control signal communication between a mechanism in said lens assembly and a mechanism in a camera to which the lens assembly is attached, said first and second signal transmitting members having annular portions, said annular portions having groove portions formed therein for holding bearing balls;

barrel means constituting part of said lens assembly, said barrel means having at least two annular portions overlapping with each other about the optical axis, said annular portions having groove portions which face the groove portions of the signal transmitting members respectively to form spaces for housing said bearing balls; and retainer means having a belt shape placed in said spaces formed by the groove portions of the first and second signal transmitting members and said groove portions of the barrel means, said retainer means having holes formed therein for retaining said bearing balls;

wherein said first and second signal transmitting members are rotatably retained about the optical axis at predetermined positions in the optical axis direction of said barrel means as said bearing balls are retained in the groove portions of the annular portions, and a transmission of said exposure control signal is accomplished corresponding to the rotation thereof.

8. A support structure for signal transmitting means in a lens assembly comprising:

first and second signal transmitting members having axially elongate portions for communicating an exposure signal between a mechanism in said lens assembly and a mechanism in a camera body to which said lens assembly is attached, and having annular portions for enabling said signal transmitting members to be mounted on said lens assembly in a manner rotatable about the optical axis by bearing balls within said lens assembly, said annular portions of the first and second signal transmitting members having groove portions for engagement with said bearing balls;

barrel means constituting part of said lens assembly, said barrel means having at least two annular portions, wherein circumferential grooves are formed at an inner circumference or an outer circumference of one of said annular portions thus forming spaces to house said bearing balls together with said groove portions of the first and second signal transmitting members;

first retainer means placed within said spaces, said first retainer means consisting of members of a belt shape or an annular shape for retaining said bearing balls with a predetermined separating distance in a freely rotatable manner; and second retainer means held by said annular portions of said barrel means, said second retainer means being inserted in holes provided in said annular portions of the barrel means and holding the bearing balls with recesses formed at their fore ends together with the groove portions of the first and second signal transmitting members, wherein said first and second signal transmitting members have their respective annular portions retained by the bearing balls in a rotatable manner about the optical axis at a predetermined position of said barrel means.

9. A support structure according to claim 5, 6, 7 or 8 in which both ends of the circular belt member or the retainer member of a belt shape or of an annular shape have connecting portions to connect said belt member or annular member in an endless manner.

10. A support structure according to claim 9 in which said connecting portions of the belt member or the annular member have adjusting means which can adjust an aperture around the optical axis.

11. A support structure according to claim 5, 6, 7 or 8 in which said barrel means consist of a lens barrel member, a ring member retained by said lens barrel member and a cover member, said ring member and said cover member having taper portions at their respective end parts, said taper portions forming said groove portions of the barrel means to retain the bearing balls.

* * * * *